United States Patent [19]
Stridsberg

[11] Patent Number: 5,917,259
[45] Date of Patent: Jun. 29, 1999

[54] COUPLING OF AN ELECTRIC MOTOR TO A LOAD

[75] Inventor: Lennart Stridsberg, Enskede, Sweden

[73] Assignee: Stridsberg Innovation AB, Enskede, Sweden

[21] Appl. No.: 08/836,476

[22] PCT Filed: Nov. 21, 1995

[86] PCT No.: PCT/SE95/01393

§ 371 Date: Jul. 21, 1997

§ 102(e) Date: Jul. 21, 1997

[87] PCT Pub. No.: WO96/16465

PCT Pub. Date: May 30, 1996

[30] Foreign Application Priority Data

Nov. 21, 1994 [SE] Sweden ................................. 9404042
Mar. 29, 1995 [SE] Sweden ................................. 9501148

[51] Int. Cl.[6] .............................. H02K 7/00; H02K 7/10; H02K 37/22

[52] U.S. Cl. .................... 310/75 D; 310/75 R; 310/75 A; 310/80; 74/17.8; 74/18; 74/640; 464/78; 464/79; 464/80

[58] Field of Search .............................. 310/75 R, 75 A, 310/80, 75 D; 74/17.8, 18, 640; 464/79, 80, 78

[56] References Cited

U.S. PATENT DOCUMENTS

| | | | |
|---|---|---|---|
| 3,933,052 | 1/1976 | Coles ..................................... | 74/18.1 |
| 4,492,906 | 1/1985 | Goto et al. .............................. | 318/488 |
| 4,533,891 | 8/1985 | Vanderlaan et al. .................... | 310/80 |
| 4,577,127 | 3/1986 | Ferree et al. ............................ | 310/83 |
| 4,607,180 | 8/1986 | Atoody ................................... | 310/80 |
| 4,744,737 | 5/1988 | Yamamura et al. .................... | 418/55 |
| 4,806,809 | 2/1989 | Kubota et al. ......................... | 310/75 D |
| 4,934,416 | 6/1990 | Tonkiss .................................. | 140/93.2 |
| 5,214,970 | 6/1993 | Vezain .................................... | 74/18.1 |
| 5,233,247 | 8/1993 | Stark ....................................... | 310/83 |
| 5,391,953 | 2/1995 | Van De Veen .......................... | 310/80 |

FOREIGN PATENT DOCUMENTS

| | | |
|---|---|---|
| 0 402 240 | 6/1989 | European Pat. Off. . |
| 28 19 765 | 5/1978 | Germany . |
| 41 21 428 | 6/1991 | Germany . |

Primary Examiner—Nestor Ramirez
Assistant Examiner—Tran N Nguyen
Attorney, Agent, or Firm—Oblon, Spivak, McClelland, Maier & Neustadt, P.C.

[57] ABSTRACT

An improved connection coupling for providing rotary motion from an electric motor rotor to a load wherein a mechanical coupling element is attached to an end of the rotor and to the shaft of the load. The free end of the rotor includes a cavity which extends axially from the end surface of the rotor inward to allow for insertion of a portion of the mechanical coupling element in the cavity. The walls of the cavity do not contact the portion of the mechanical coupling element to allow this mechanical coupling element to move freely in the rotation direction.

20 Claims, 6 Drawing Sheets

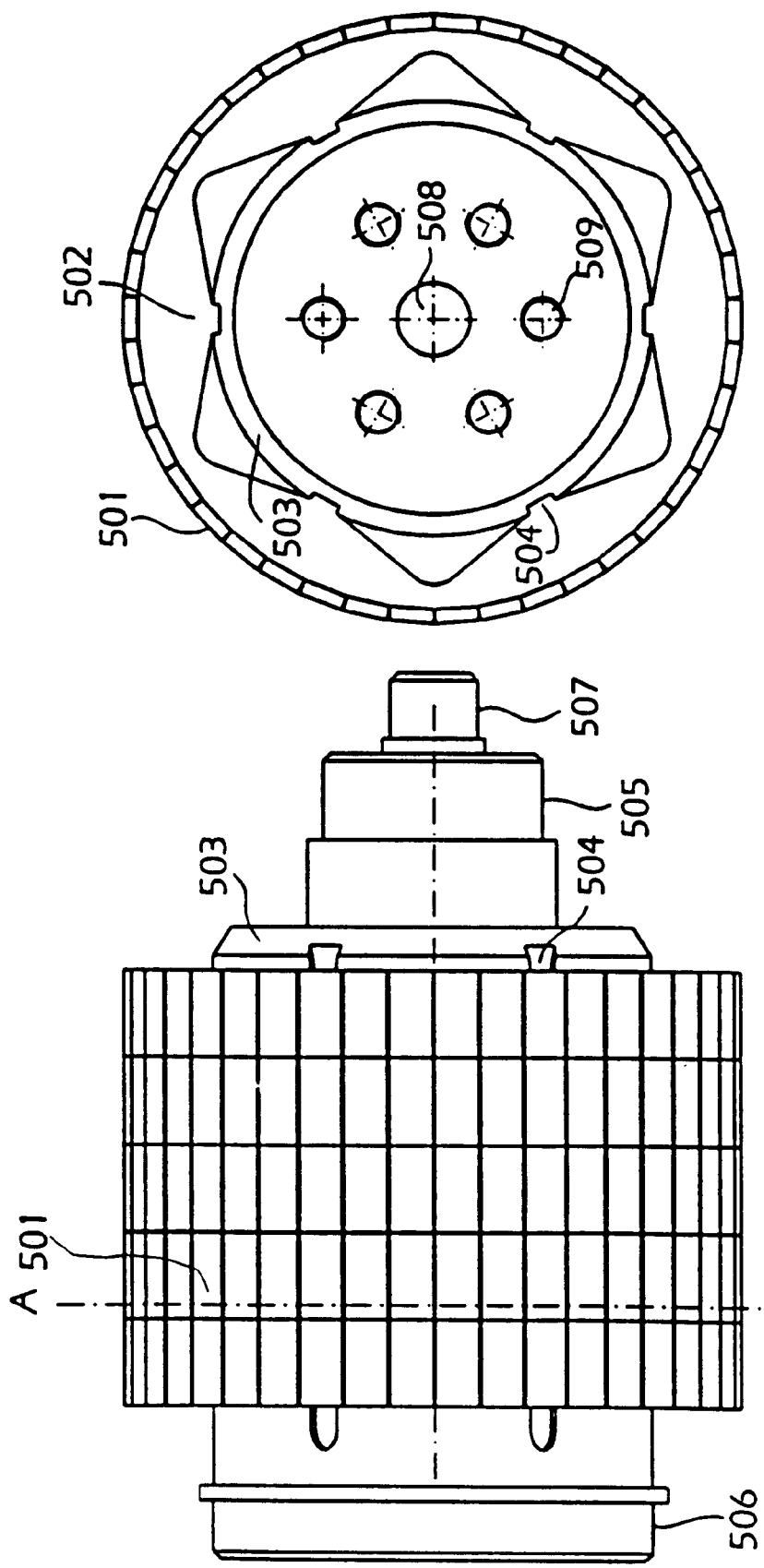

COUPLING OF AN ELECTRIC MOTOR TO A LOAD

BACKGROUND OF THE INVENTION

1. Field of the Invention

The invention relates to a device for coupling an electric motor to a load and an electric motor especially constructed therefor and also to a mechanical coupling element to be used in the device and motor.

2. Discussion of Background

In many machines electric motors are used for driving loads that require bearings other than those that are placed within the electric motor itself. In such cases the motor shaft has normally bearings inside the motor and the load has bearings inside the machine. In coaxial arrangements, the motor shaft is then connected to the shaft of the load by some kind of mechanical coupling. The coupling has the purpose of transmitting the torque as provided by the motor to the load shaft with a sufficient elasticity in order to be capable of absorbing normally occurring radial and angular misalignments between the motor shaft and the load shaft. The coupling should perform this with an acceptably low torsional elasticity and with an acceptably low mechanical play.

Both servo motors and conventional electric motors for less precise tasks like driving pumps, fans and conveyor belts are often connected to their loads using couplings that require considerable additional length in the axial direction.

Some devices for reducing the axial lengths of an assembly of two coaxial units each one having radially stiff bearings are known in the prior art. Many of these devices concern small auxiliary units necessary for the operation of a far larger main machine. These auxiliary units, such as tachogenerators, resolvers, encoders and exciters, require very low or almost negligible torques what permits simple coupling arrangements.

U.S. Pat. No. 2,956,187 discloses how an exciter can be connected to a synchronous generator using a annual hole drilled in the end tap of the main shaft of the synchronous generator. Both the exciter and the generator have bearings in both ends of the shafts. The diameter of the generator shaft is reduced in the end in the way commonly used to fit a ball bearing in the rear end of the generator. The torque required to run the exciter is much smaller than the torque required to run the generator. Therefore the coupling used to drive the exciter can be inserted in an annual hole drilled in this bearing tap of the generator shaft without affecting the required exterior diameter of the generator shaft or its bearings.

The Swedish published patent application SE-A 352 491 discloses a generator to be attached to a wheel shaft of a railway vehicle. In order to reduce the axial length, the rotor bearings are located close to each other inside the rotor. A flexible coupling outside one side of the rotor drive a low speed shaft concentric with the rotor shaft. This low speed shaft extends through the full length of the generator rotor and drives a planetary gearbox outside the other side of the rotor. The rotor is driven from this planetary gearbox at an angular speed some seven times higher than that of the driving low speed shaft.

U.S. Pat. No. 3,560,774 discloses a stepping motor having a tube-shaped rotor that does not seem to have any bearings. The output shaft runs through the tube-shaped rotor. The tube-shaped rotor seems to be always in contact with the inner surface of the stator. The inner diameter of the stator is larger that the outer diameter of the rotor. The rotor moves eccentrically relative to the output shaft. Coupling(s) are therefore necessary to transfer the rotor torque to the output shaft. These couplings are located between the two output shaft bearings.

The published Swedish patent application SE-A 369 808 discloses a motor driving a pump. The pump shaft has a full set of bearings, but the motor does only have a bearing in the end thereof which is remote from the pump. In the rotor end facing the pump, the rotor has a flexible end disc in the centre of which an annular device having a key slot is inserted. This key slot fits the driven pump shaft, that has a key which fits the key slot of the rotor. The problem of aligning two shaft with radially fixed bearings is in this case solved by eliminating one of the motor bearings.

The West German patent DE-C2 28 19 765 discloses a tachometer generator. The torque required for driving the generator is supplied through a shaft that enters the rotor and is connected to an internal rotor shaft by a flexible coupling inside the rotor. The shafts as shown in this patent are very thin compared with the normally extremely stiff shafts between a servo motor and its tachogenerator, that is the shafts have diameters of 1/11th of the generator outer diameter and some ⅛ of the rotor diameter. The torsional stiffness required is however very low as the application cited concerns speed measurement of a railway vehicle. As the accelerations of railway vehicles is very low, the torque required for the acceleration of the tachometer rotor is also very low, and the torque required for supplying the electric power taken from a tachogenerator is negligible. It is pointed out in the patent that a tachogenerator according thereto will have a significantly larger diameter than conventional tachogenerators but also have a shorter axial length. It is also pointed out that in the applications intended for the invention, the space occupied by the larger generator diameter earlier has been unused as the device the speed of which is to be measured has a diameter that is far larger than that of the tachometer. It is also pointed out that the increased generator diameter permits a far higher number of poles, thus permitting an output signal with less ripple.

The published British patent application GB-A 2 117 572 discloses an alternative to a flexible shaft coupling when connecting a position sensor to a motor. The sensor and the motor are coaxial units each having radially stiff bearings. Instead of having the frames of the sensor and motor rigidly connected and using a flexible coupling between the shafts, the shafts are joined by a stiff coupling and the two frames are joined by a torsionally rigid but radially flexible diaphragm. The embodiments shown, see e.g. FIG. 4, do not seem to permit shorter axial lengths that of conventional embodiments using bellows couplings, compare FIG. 2.

U.S. Pat. No. 4,577,127 discloses a robot actuator comprising an electric motor inserted inside the cup-shaped casing of a harmonic drive gear box. In the centre of the concentric motor and harmonic drive, there is a coupling 135, see FIG. 3. A shaft, 133 and 131 in FIG. 3 from the coupling drives a resolver 118 and 141 that is located coaxially with the motor and the harmonic drive gear box but outside the motor and harmonic drive.

SUMMARY OF THE INVENTION

It is an object of the invention to provide a device for coupling an electric motor to a load that permits the mechanical coupling element to be at least partially located inside the motor case, thereby reducing the axial length of the combined coupling and motor.

It is another object of the invention to provide an electric motor having a mechanical layout that permits the mechanical coupling required to transfer torque between the motor and its load to at least partially be located inside the motor case, thereby reducing the axial length of the combined coupling and motor.

It is another object of the invention to provide an electric motor having a mechanical layout that permits the motor to be directly attached to a chassis or frame of the load in such a way that the bearings and shafts of the motor and the load, and the mechanical coupling therebetween, will be protected from aggressive gases, solid particles or fluids from the environment.

It is another object of the invention to provide an electric motor having a mechanical layout that permits the motor to be directly attached to a chassis or frame of the load in such a way that the bearings and shafts of the motor and the load, and the mechanical coupling therebetween, will be inaccessible from accidental contact with human hands, pets, etc.

It is another object of the invention to provide an electric motor having a mechanical layout that permits the motor to be directly attached to a chassis or frame of the load in such a way that the heat from the motor can use the load frame or chassis as a heat sink.

It is another object of the invention to provide an electric motor having a mechanical layout permitting that the motor to be directly attached to a chassis or frame of the load, thus permitting a very stiff mechanical connection between the motor frame and the load chassis, thereby permitting the implementation of a stiffer servo regulation.

These objects are achieved by the invention, the characteristics and features of which appear from the appended claims.

In order to allow a short axial length of the assembly of an electric motor mounted to a load, an opening, recess or cavity is provided in an end of the shaft of the motor, this opening extending axially into the shaft from an essentially flat end surface thereof. The opening is dimensioned for receiving at least part of a mechanical coupling. The opening does not generally penetrate the whole motor or motor shaft but of course there may be small diameter hole all through the shaft, this hole then having a diameter that much less than the diameter of the opening intended to contain or at least partly enclose the coupling elements. The inner end plate of the generally standard coupling is modified to have no central opening for receiving a shaft end but instead to have a central projection fitting in a corresponding central hole in the bottom surface of the recess. The inner end plate is secured to the bottom surface by means of screws which are available through the central opening in the outer end plate.

For servo applications, the mechanical coupling is preferably of a type commonly used for servo motor drives, i. e. a coupling having a negligible mechanical play and a high stiffness. The inner diameter of the motor load side bearing is then increased to a value exceeding what is necessary to fulfil requirements of mechanical robustness or to provide commonly used motor shaft diameters for the motor size, for allowing that the opening is made in the motor shaft centre to permit insertion of the mechanical coupling in this opening.

The opening has preferably such a depth that is sufficient for permitting at least a part of an elastic member of the mechanical coupling to be located within the axial region of a motor bearing, in particular within the region of any of two circular cylinders, the envelope surface of which is defined by the inner or outer ring of the bearing.

Thus a device for connection of the rotary motion of a electric motor rotor to a load has as conventionally a mechanical coupling element attached to an end of a shaft of the rotor and to a shaft of the load. An opening, cavity or recess in the rotor shaft end extends axially from an end surface of the shaft to permit the insertion of at least a part of the mechanical coupling element in this cavity or recess. The cavity is preferably circular-cylindrical and does not extend all through the shaft but has a bottom surface which may be flat, perpendicular to the rotational axis of the motor.

The electric motor may in the conventional way have a rotary bearing for supporting the rotor shaft at the load end of the shaft. Then the cavity or recess can extend so far or deeply into the end of the rotor shaft that at least a part of the mechanical coupling element is located beyond, as seen axially, a plane passing somewhere through the bearing, such as a plane passing centrally through the bearing, the plane being perpendicular to the rotational axis of the motor.

The electric motor can naturally have a first rotary bearing for supporting the rotor shaft at the load end and a second rotary bearing at a second, opposite end of the rotor shaft. In order to accomodate the recess or cavity and thus a portion of the coupling an inner diameter of the first bearing can be significantly larger than an inner diameter of the second bearing, such as that the inner diameter of the first bearing being is at least 25% and preferably at least 50% larger than the inner diameter of the second bearing. This means thus that the rotor shaft has an increased diameter in the region where the cavity or recess extends into the shaft end compared to the adjacent portion of the rotor shaft.

As conventional, the electric motor may have armature windings for generating a magnetic field across an airgap at a surface of the rotor and also permanent magnets for some types of motors. Then the cavity or recess can extend so far into the end of the rotor shaft that at least a part, e.g. an inner end plate thereof and even a flexible, intermediate coupling element, of the mechanical coupling element is located in the axial region of some part of the windings, airgap or magnets, i.e. is located axially beyond or deeper than a perpendicular plane passing through the outermost portion or side of the armature winding and or of the airgap or of the magnets, this plane being that one which is located most adjacent to the load or to the mechanical coupling element, as seen in an axial direction.

In a preferred embodiment the cavity or recess has such a depth or is so arranged, that essentially the whole mechanical coupling element can be located inside the cavity or recess. The cavity or recess and the mechanical coupling element can then even have dimensions or be arranged so that an end surface, that is the outer end surface, of the mechanical coupling element will be located in essentially the same plane as an axial side surface of the electric motor.

The mechanical coupling element can in the conventional way comprise a first end plate, a second end plate and an intermediate element, for example flexible or elastic, allowing some axial offset between the end plates, in regard of the rotational axis of the coupling. At least one of the end plates and e.g. the intermediate element of the mechanical coupling element can then be attached and located completely inside the cavity or recess and thus be located inside or axially beyond a perpendicular plane passing through the outermost portion of the cavity or recess.

The mechanical coupling used can have one end plate configured with an essentially flat outer surface, located essentially in a plane perpendicular to a rotational axis of the coupling. The first end plate can contact, with this essentially flat surface, a corresponding, essentially flat surface of the rotor shaft of the electric motor, so that the torque from the motor to the coupling is transferred at or through these surfaces. Thus retaining elements such as screws may be arranged in the first end plate and pass through the essentially flat surface of the end plate for retaining the first end plate at a corresponding, essentially flat surface of an electric motor, that is preferably at the inner, bottom surface of the cavity or recess in the motor shaft end.

The second, opposite end plate has then advantageously, as conventional, a through-hole extending axially along a rotational axis of the coupling, this hole being intended to receive a shaft of a load, where the hole, the intermediate element and the retaining elements of the coupling are so arranged that the retaining elements are accessible through the hole, e.g. by means of a screwdriver or similar tool.

BRIEF DESCRIPTION OF THE DRAWINGS

The invention will now be described with reference to specific embodiments which are not intended to limit the invention, the scope and characteristics of which are set out in the appended claims, the embodiments being illustrated in the accompanying drawings in which:

FIG. 5a is an elevational view of a 6 pole brushless servo motor rotor designed for a torsionally stiff space saving connection to its load, FIG. 5b is a sectional view of the rotor of FIG. 5a taken along the line A—A, FIG. 6b is a sectional view of an alternative coupling for the motor of FIG. 6a.

DETAILED DESCRIPTION

Figure 1:
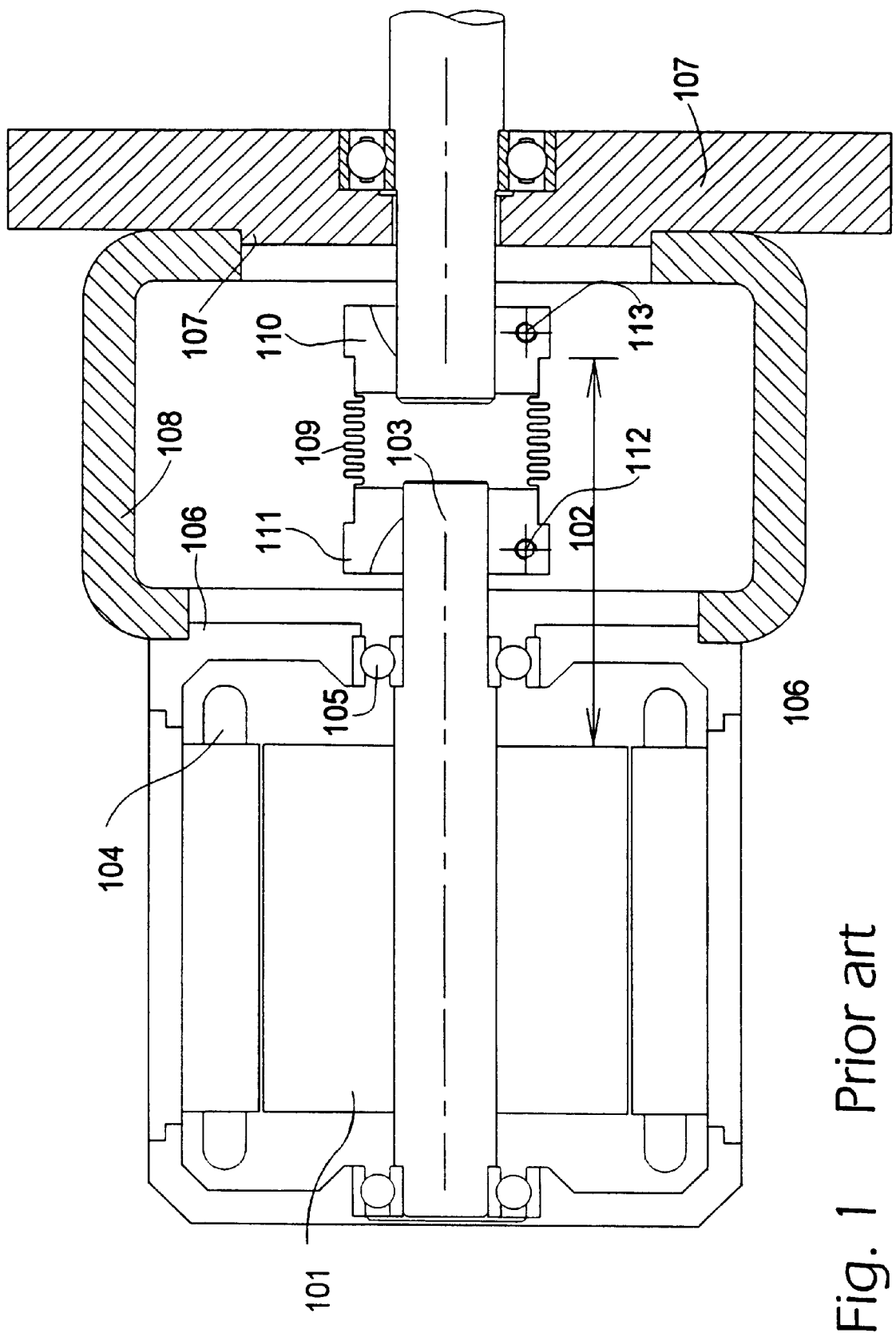
FIG. 1 is a sectional view showing a prior art connection of a motor to a load using a torsionally stiff shaft coupling.

An example of a conventional arrangement for servo motors is shown in the sectional view of FIG. 1. The torque acts on the motor rotor 101 and thus on the shaft thereof. The distance 102 from the near side of the magnetically active part of the rotor 101 to the point of the machine shaft where the torque from the motor enters the load shaft is fairly long. It includes the winding heads 104, the motor front rotor bearing 105, part of the rotor front stub shaft 103, the motor shaft coupling fixture 111 and the total length of the elastic part 109 of the coupling.

In order to obtain only a small radial displacement between the two shafts, annular shoulders 106 on the motor and 107 on the machine chassis are made to fit into a joining element 108. It can be observed that a potential radial misalignment will appear both at the attachment of the shoulder 106 to the joining element 108 and at the attachment of the shoulder 107 to the joining element 108. The coupling 109 shown is a commercially available metal bellows type coupling having two end parts or braces 110 and 111, the inner diameters of which can be reduced by tightening screws 112 and 113.

Figure 2:
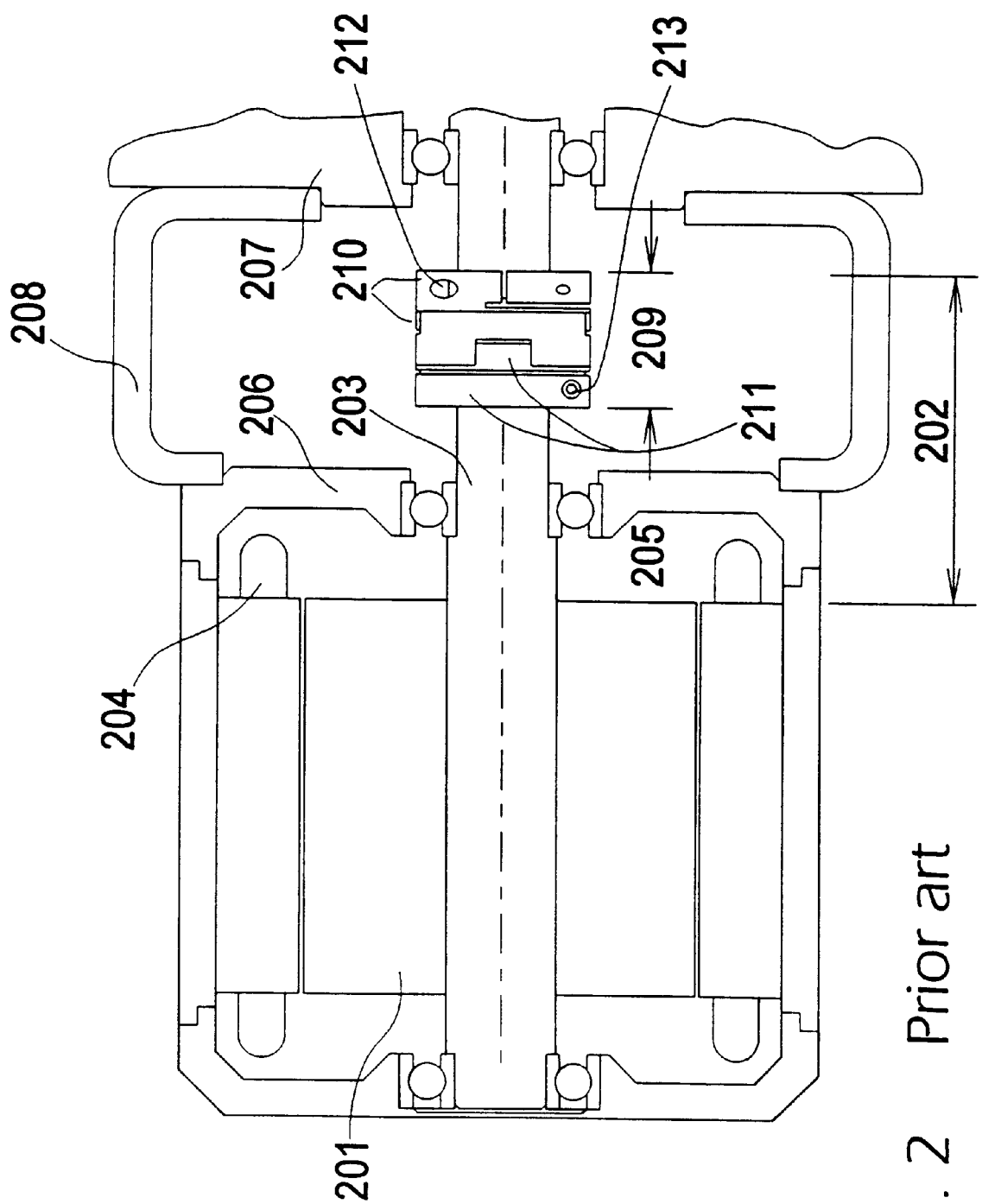
FIG. 2 is a sectional view of a prior art connection of a motor to a load using a shaft coupling having a considerable play.

Another example of a conventional arrangement is shown in the sectional view of FIG. 2. The torque acts on the motor rotor 201 and the shaft thereof. The distance 202 from the side of the rotor to the point of the machine shaft where the torque from the motor enters the load axis is fairly long. It consists of the rotor front axis 203 and the coupling 209. The distance 202 includes the winding heads 204, the motor front rotor bearing 205, parts of the rotor front journal 203 and the total length of the coupling 209.

To obtain a small radial displacement between the two rotational axes of the motor and the load, shoulders 206 on the motor and 207 on the machine chassis are made, as has been described with reference to FIG. 1, to fit into a joining element 208. It can be observed that a potential radial misalignment will appear both at the attachment of the shoulder 206 to the element 208 and at the attachment of the shoulder 207 to the element 208. The coupling 209 shown is a commercially available "Oldham" coupling comprising two end parts 210 and 211, the inner diameters of which can be reduced by tightening screws 212 and 213.

Figure 3:
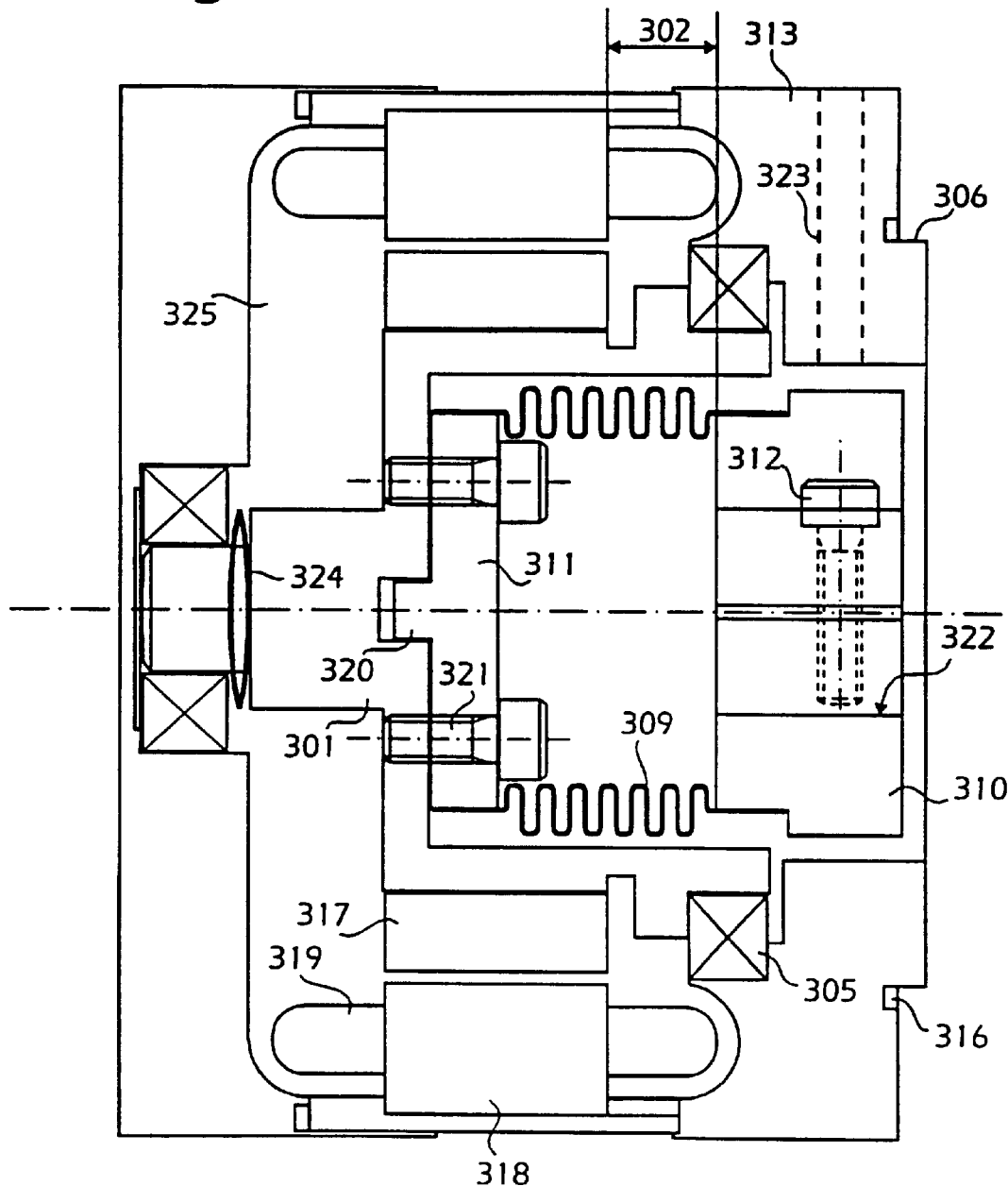
FIG. 3 is a sectional view of a space saving connection of a motor to a load using a torsionally stiff shaft coupling.

In FIG. 3 a coupling having a reduced distance, as defined above, is shown for a specially designed motor. The torque acts on the motor rotor 301 by the interaction between rotor permanent magnets 317 and a stator 318, the winding heads of which are shown at 319. The distance 302 from the near side of the rotor to the point of the machine shaft where the torque from the motor enters the load shaft is fairly short.

The elastic coupling part 309 is partially inserted inside, as seen in the axial direction, the magnetically active parts 317–318 of the motor. The coupling shown is a slight modification of a commercially available metal bellows type coupling having two end parts 310 and 311. The modified inner part 311 has a cylindrical pin 320 that fits into an annual hole in the rotor 301, thereby enforcing a good radial alignment between the rotor 301 and the coupling inner part 311. It is fastened to the rotor 301 by means of screws 321. These screws can be accessed without disassembling the motor by using a spherical head hexagonal screw driver trough the hole 322 in the front coupling end part 310.

The coupling front part 310 is a standard element in commercially available couplings. The inner diameter of the coupling shaft hole 322 can be decreased by the tightening of a screw 312. This screw is accessible from the outside through a hole 323 in the motor front part 313. The hole 323 can be covered by a screw, cap or other device, not shown, to stop dust or fluids to enter the coupling or the bearings 305 or the bearings, not shown, of the load. An O-ring in an annual groove 316 can further protect the coupling and the bearings from dust and fluids assuming that the motor front flange 306 is directly connected to the chassis of the machine containing the load shaft. The arrangement according to FIG. 2 thus also permits a simple solution to protect motors, their shafts and bearings and the shafts and bearings of their loads from corrosive or abrasive gases, fluids or particles from the environment outside the machines to which the motors are attached.

The front motor bearing 305 has a diameter large enough to permit the elastic part 309 of the coupling to enter inside the rotor. This large diameter will increase the friction of the bearing compared to prior art designs for a given axial or radial load. The arrangement shown will however reduce the axial and radial loads on the rotor to a small fraction of the loads expected in conventional motor shaft design. The motor bearings can therefore be much lighter than in a conventional motor, and the axial preload required to give low play of the rotor shaft, for example by means of a spring 324, can be reduced accordingly.

In order to obtain a small radial displacement between the two shafts, an annular shoulder 306 on the motor should advantageously be made to fit into a annual recess on the machine chassis. It can be observed that a possible radial misalignment will appear only at the assembly of the shoulder 306 into this recess. There is therefore only one joint that affects the radial misalignment between motor and the machine chassis, contrary to the conventional arrangement as illustrated in FIG. 1, where there are two such stepped joints. This will approximately reduce the expected misalignment by a factor of two, what permits a shorter length of the elastic part 309 of the coupling, thus permitting a shorter design and a torsionally more stiff coupling. The elimination of the capping element 108 and the eliminated motor front journal will also result in a more stiff connection between the torque creating parts 317 and 318 of the motor and the torque receiving parts of the load. The increased stiffness permits higher servo gains and thus a stiffer servo operation.

Obviously, the arrangement according to FIG. 3 gives a very compact design. In many cases the total length of the motor according to FIG. 3 will be approximately equal to the length of element 108 of the conventional arrangement of FIG. 1. The necessary length of the elastic part 309 of the coupling can be made shorter due to reduced radial misalignment. As shown in FIG. 3, parts of this shorter elastic coupling can be housed inside the torque producing part of the rotor. With the embodiment shown in FIG. 3, a standard load shaft would have its innermost end located, as seen in the axial direction, inside the torque producing part of the rotor.

As is obvious for those skilled in the art, the coupling arrangement as described with reference to FIG. 3 as applied to a modified rotor can be used also for other types of couplings, and for other types of inner parts 311 of couplings, for example for any one of the basic coupling end part types marketed by the metal bellow manufacturer "GERWAH". Some coupling manufacturers like "C&K" produce bellow couplings which are delivered as two separate parts that are to be attached to the two shafts independently of each other. A complete coupling is obtained when the two parts are lightly pressed to each other. Obviously, such couplings and basically all other coupling types can be used in the arrangement as illustrated in principle in FIG. 3.

The motor type shown in FIG. 3 is motor comprising permanent magnets and brushless commutation. The basic coupling arranged as shown in FIG. 3 can however be used in most motor technologies, such as induction motors, some stepper motors, switched reluctance motors, brush commutated DC motors having wound iron rotors, having ironless cylinder rotors and having disc-shaped rotors.

Figure 4:
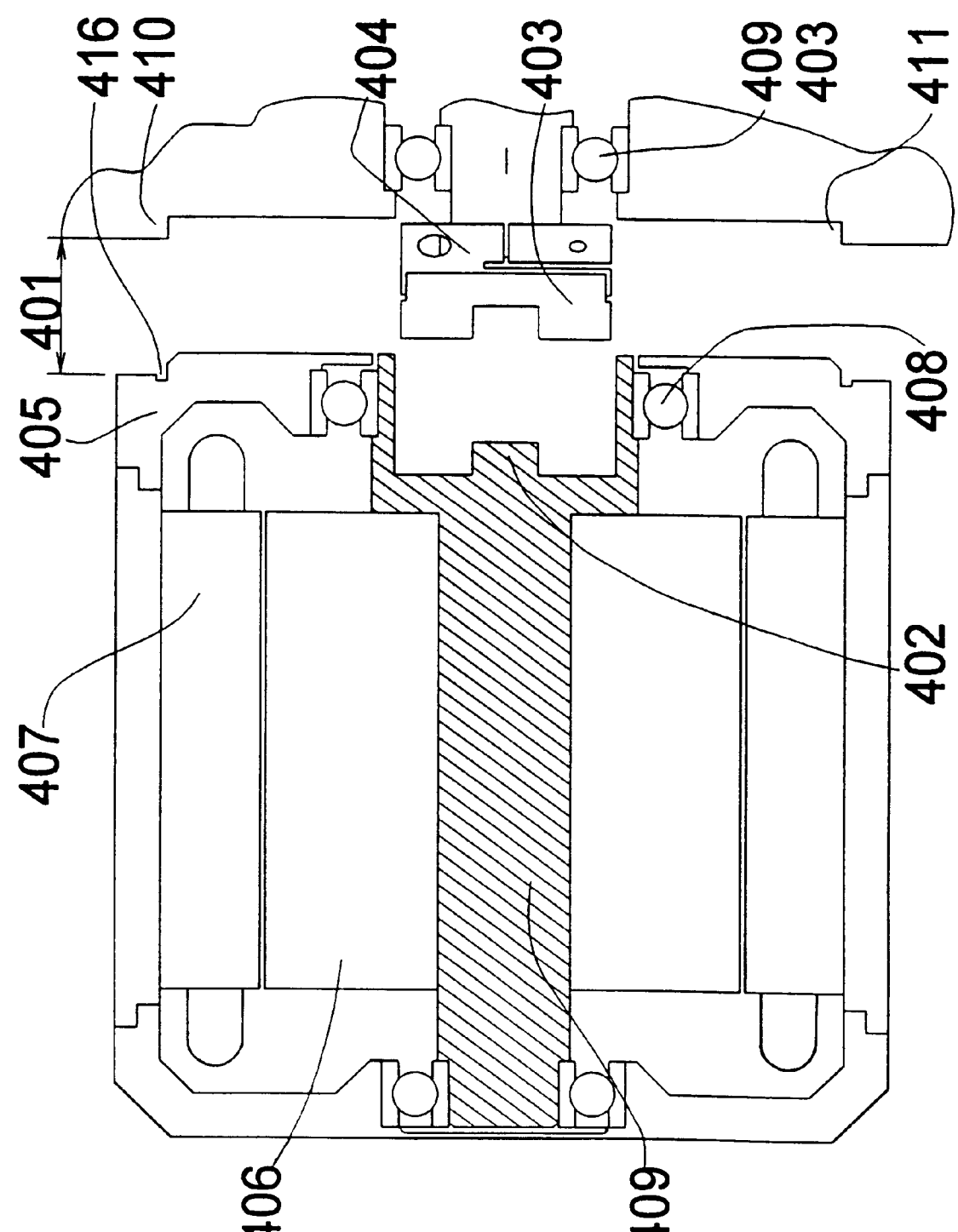
FIG. 4 is a sectional view of an alternative space saving connection of a motor to a load using a shaft coupling having a considerable play.

In FIG. 4 a sectional view is shown of a motor in a position before the final assembly to the machine that it is to drive. In the finally assembled position the distance 401 is equal to zero.

The motor shaft part 402 of the Oldham coupling 402, 403, 404 is located inside the motor front shield 405 and inside the ball bearing 408. For longer coupling types, part of the coupling can be inserted even further into the magnetically active parts of the motor, that is inside the rotor 406. Two of the three coupling parts 403 and 404 are commercially available standard parts. The third part, corresponding to 311 of FIG. 3, is made as an integral part of the rotor shaft 409.

An O-ring in an annual groove 416 can protect the coupling and the motor and load bearings 408 and 409 from dust and fluids assuming that the motor front flange 405 is directly connected to the chassis 410 of the machine containing the load shaft. The arrangement according to FIG. 4 thus also permits a simple solution to protect motors, their shafts and bearings and the shafts and bearings of their loads from corrosive or abrasive gases, fluids or particles from the environment outside the machines to which the motors are attached.

The front motor bearing 408 has a diameter large enough to permit the coupling to enter inside the motor. This large diameter will increase the friction of the bearing compared to prior art designs for a given axial or radial load. The design shown will however reduce the axial and radial loads on the rotor to a small fraction of the loads expected in conventional motor shaft. The motor bearing ratings can therefore be much lower than in a conventional motor.

The motor type illustrated in FIG. 4 is an induction motor. It can however be used in most motor technologies, such as motors comprising permanent magnets and having brushless commutation, stepper motors, switched reluctance motors, brush commutated DC motors having wound iron rotors, having ironless cylinder rotors and having disc-shaped rotors.

In FIGS. 5a and 5b a 6 pole brushless servo motor rotor is shown designed for a torsionally stiff space saving connection to its load. Permanent magnets like 501 are attached to a stack 502 of punched sheets of electrical steel. These sheets have six teeth that fits into grooves 504 on the exterior side of the shaft 503, 505, 506, 507. The shaft has at its driving end, the left end as seen in the figure, a part 503 enclosing a cylindrical recess into which a coupling, for example a torsionally stiff coupling like the one shown in FIG. 3 can be inserted using a centre hole 508. Tapped holes 509 are used for screws that maintain the coupling part in the correct position.

The rotor shaft has stepped portions for supporting the front bearing at 506, the rear bearing at 505 and a position feedback resolver at 507.

Figure 6A:
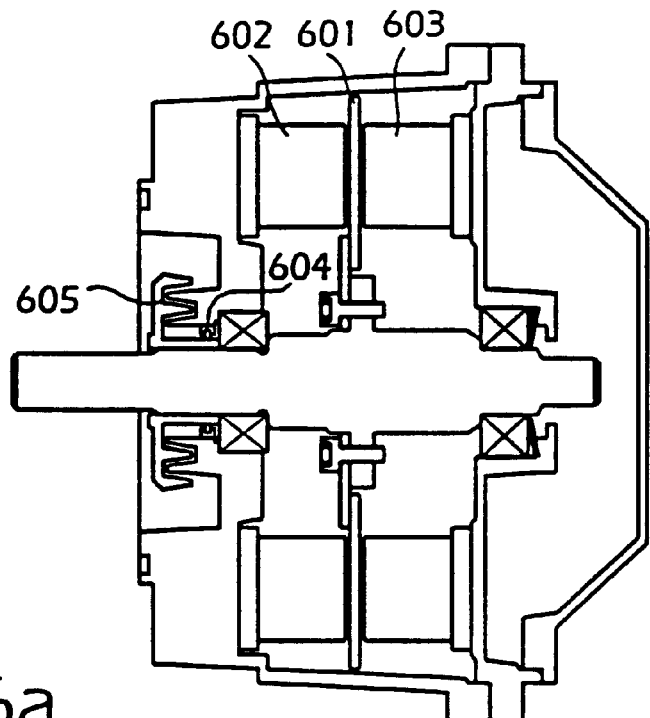
FIG. 6a is a sectional view of a brush commutated disc rotor servo motor designed for a torsionally stiff space saving connection to its load.
Figure 6B:
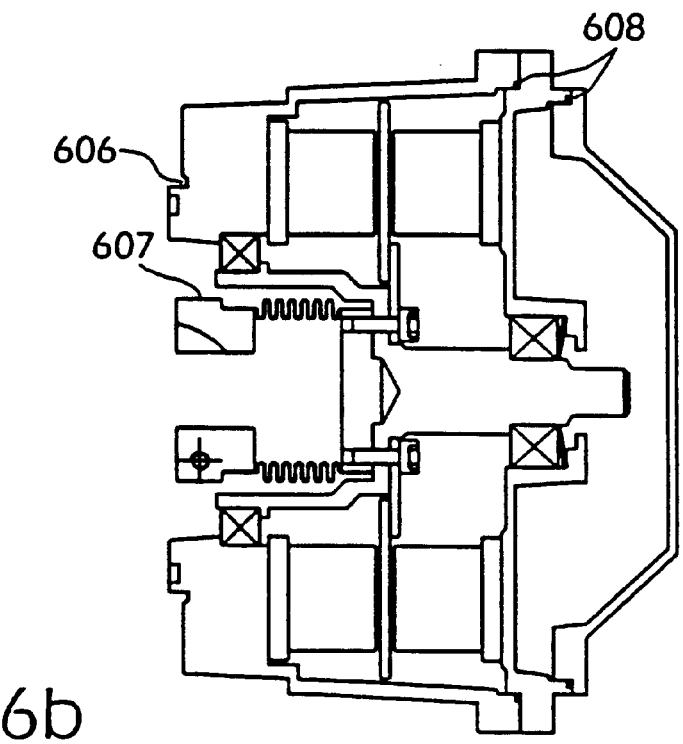

In FIGS. 6a and 6b a disc rotor DC servo motor having brush commutation is shown. FIG. 6a shows a simplified drawing of a motor that has been sold as "MC13" by the company Parvex, Dijon, France for several decades of years. The AlNiCo permanent magnets 602 and 603 are divided by an air gap in which the disc-rotor 601 is situated. A seal 604 class IP55 is protected by a labyrinth protection 605 of class IP44.

FIG. 6b shows the same basic motor comprising an internal torsionally stiff coupling. The addition of an O-ring grove 606 permits a class IP68 seal to the machine driven by the motor, and additional O-rings 608 give a similar protection to the interior of the motor.

Of course, various modifications and additions could be incorporated without departing from the spirit and scope of the invention. For example, the invention can be applied in various forms of electrical motors having rotary shaft ends such as that the rotor and the shaft thereof are an integral unit. Other types of mechanical couplings can be used. Also, the bearings can be various types, not necessarily being rolling bearings.

I claim:

1. A device for a connection of a rotary motion of an electric motor rotor to a load, comprising:

a shaft of the load;

a mechanical coupling element attached to an end of the rotor and to the shaft of the load, wherein the end of the rotor has a cavity or recess extending axially from an end surface of the end of the rotor into the rotor to permit insertion of at least a part of the mechanical coupling element in the cavity or recess wherein walls of the cavity or recess do not contact and freely surround, in radial directions, said at least part of the mechanical coupling element allowing for a movement of the mechanical coupling element in relation to the walls, thereby providing for a reduction in an axial length of the device which is necessary for conveying the rotar motion to the load.

2. A device according to claim 1, where the electric motor has a rotary bearing for supporting the rotor shaft at the end thereof, characterized in that the cavity or recess extends so far into the end of the rotor shaft that at least a part of the mechanical coupling element is located axially beyond a plane passing through the bearing, in particular a plane passing centrally through the bearing.

3. A device according to claim 1, where the electric motor has a first rotary bearing for supporting the rotor shaft at the end thereof and a second rotary bearing at a second end of the rotor shaft, characterized in that an inner diameter of the first bearing is significantly larger than an inner diameter of the second bearing, in particular the inner diameter of the first bearing being at least 50% larger than the inner diameter of the second bearing.

4. A device according to claim 1, characterized in that the rotor shaft has an increased diameter in the region where the cavity or recess extends into the shaft end compared to the adjacent portion of the rotor shaft.

5. A device according to claim 1, where the electric motor has armature windings for generating a magnetic field across an air gap at a surface of the rotor, characterized in that the cavity or recess extends so far into the end of the rotor shaft that at least a part of the mechanical coupling element is located axially beyond a plane passing through the outermost portion or side of the armature winding, that is located most adjacent to the load or to the mechanical coupling element, as seen in an axial direction.

6. A device according to claim 1, where the electric motor includes magnets separated by an air gap at a surface of the rotor, magnetic fields being generated across an airgap of the motor for creating a torque of the motor, characterized in that the cavity or recess extends so far into the end of the rotor shaft that at least a part of the mechanical coupling element is located axially beyond a plane passing through the outermost portion or side of the airgap, that is located most adjacent to the load or to the mechanical coupling element, as seen in an axial direction.

7. A device according to claim 1, where the electric motor has a set of magnets for generating a magnetic field across an air gap at a surface of the rotor, characterized in that the cavity or recess extends so far into the end of the rotor shaft that at least a part of the mechanical coupling element is located axially beyond a plane passing through the outermost portion or side of the set of magnets, that is located most adjacent to the load or to the mechanical coupling element, as seen in an axial direction.

8. A device according to claim 1, characterized in that the cavity or recess has such a depth or is so arranged, that essentially the whole mechanical coupling element is located inside the cavity or recess.

9. A device according to claim 8, characterized in that the cavity or recess and the mechanical coupling element are so dimensioned that an axial end surface of the mechanical coupling element is located in essentially the same plane as an axial side surface of the electric motor.

10. A device according to claim 1, where the mechanical coupling element comprises a first plate and a second end plate separated by an intermediate element providing axial offset between the plates, characterized in that at least one of the end plates of the mechanical coupling element is attached and located completely inside the cavity or recess.

11. A device according to claim 10, characterized in that the intermediate element is also located entirely within the cavity or recess.

12. An electric motor having a rotor and a stator, the rotor comprising a rotor shaft having a shaft end for a connection of a rotary motion of the rotor to a load by means of a mechanical coupling element, wherein the end of the rotor has a cavity or recess extending axially from an end surface of the end of the rotor into the rotor to permit insertion of at least a part of the mechanical coupling element in the cavity or recess and wherein walls of the cavity or recess do not contact and freely surround, in radial directions, said at least part of the mechanical coupling element allowing movement of the mechanical coupling element with respect to said walls thereby providing for a reduction in an axial length of the device which is necessary for conveying the rotary motion to the load.

13. A motor according to claim 12, where the electric motor has a rotary bearing for supporting the rotor shaft at the end thereof, characterized in that the cavity or recess extends so far into the end of the rotor shaft that at least a part of the mechanical coupling element is located axially beyond a plane passing through the bearing, in particular a plane passing centrally through the bearing.

14. A motor according to claim 12, where the electric motor has a first rotary bearing for supporting the rotor shaft at the end thereof and a second rotary bearing at a second, opposite end of the rotor shaft, characterized in that an inner diameter of the first bearing is significantly larger than an inner diameter of the second bearing, in particular the inner diameter of the first bearing being at least 50% larger than the inner diameter of the second bearing.

15. A motor according to claim 12, characterized in that the rotor shaft has an increased diameter in the region where the cavity or recess extends into the shaft end compared to the adjacent portion of the rotor shaft.

16. A motor according to claim 12, where the electric motor has armature windings for generating a magnetic field across an air gap at a surface of the rotor, characterized in that the cavity or recess extends so far into the end of the rotor shaft that at least a part of the mechanical coupling element is allowed to be located axially beyond a plane passing through the outermost portion or side of the armature winding, that is located most adjacent to the load or to the mechanical coupling element, as seen in an axial direction.

17. A motor according to claim 12, where the electric motor includes magnets separated by an air gap at a surface of the rotor, magnetic fields being generated across an airgap of the motor for creating a torque of the motor, characterized in that the cavity or recess extends so far into the end of the rotor shaft that at least a part of the mechanical coupling element is allowed to be located axially beyond a plane passing through the outermost portion or side of the airgap, that is located most adjacent to the load or to the mechanical coupling element, as seen in an axial direction.

18. A motor according to claim 12, where the electric motor has a set of magnets for generating a magnetic field across an air gap at a surface of the rotor, characterized in that the cavity or recess extends so far into the end of the rotor shaft that at least a part of the mechanical coupling element is allowed to be located axially beyond a plane passing through the outermost portion or side of the set of magnets, that is located most adjacent to the load or to the mechanical coupling element, as seen in an axial direction.

19. A motor according to claim 12, characterized in that the cavity or recess has such a depth or is so arranged, that essentially the whole mechanical coupling element is allowed to be located inside the cavity or recess.

20. A motor according to claim 19, characterized in that the cavity or recess is so dimensioned that an axial end surface of the mechanical coupling element is allowed to be located in essentially the same plane as an axial side surface of the electric motor.

* * * * *